United States Patent
Kim et al.

(10) Patent No.: US 12,505,519 B2
(45) Date of Patent: Dec. 23, 2025

(54) SYSTEMS AND METHODS FOR INPAINTING IMAGES AT INCREASED RESOLUTION

(71) Applicant: GOOGLE LLC, Mountain View, CA (US)

(72) Inventors: Soo Ye Kim, Mountain View, CA (US); Orly Liba, Mountain View, CA (US); Rahul Garg, Mountain View, CA (US); Noritsugu Kanazawa, Mountain View, CA (US); Neal Wadhwa, Mountain View, CA (US); Kfir Aberman, Mountain View, CA (US); Huiwen Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 298 days.

(21) Appl. No.: 18/022,396

(22) PCT Filed: Oct. 14, 2021

(86) PCT No.: PCT/US2021/054945
§ 371 (c)(1),
(2) Date: Feb. 21, 2023

(87) PCT Pub. No.: WO2022/081821
PCT Pub. Date: Apr. 21, 2022

(65) Prior Publication Data
US 2023/0325985 A1    Oct. 12, 2023

Related U.S. Application Data

(60) Provisional application No. 63/091,308, filed on Oct. 14, 2020.

(51) Int. Cl.
*G06T 5/77*     (2024.01)
*G06T 3/4046*   (2024.01)
*G06T 5/50*     (2006.01)

(52) U.S. Cl.
CPC .............. *G06T 5/77* (2024.01); *G06T 3/4046* (2013.01); *G06T 5/50* (2013.01); *G06T 2207/20016* (2013.01)

(58) Field of Classification Search
CPC .......... G06T 5/77; G06T 3/4046; G06T 5/50; G06T 2207/20016; G06T 5/60;
(Continued)

(56) References Cited

U.S. PATENT DOCUMENTS 9,438,769 B1 * 9/2016 Fan ....................... H04N 1/4072
11,170,472 B2 * 11/2021 Park .................. H04N 21/26258
(Continued)

FOREIGN PATENT DOCUMENTS

| EP | 3682415 A1 * | 7/2020 | ............... G06N 3/04 |
| WO | 2020/101246 | 5/2020 | |
| WO | 2020/108358 | 6/2020 | |

OTHER PUBLICATIONS

Zili Yi, Contextual Residual Aggregation for Ultra High-Resolution Image Inpainting, May 19, 2020 (Year: 2020).*
(Continued)

*Primary Examiner* — Andrew W Bee
*Assistant Examiner* — Caleb L Esquino
(74) *Attorney, Agent, or Firm* — McDonnell Boehnen Hulbert & Berghoff LLP (57) ABSTRACT

A method includes receiving an input image. The input image corresponds to one or more masked regions to be inpainted. The method includes providing the input image to a first neural network. The first neural network outputs a first inpainted image at a first resolution, and the one or more masked regions are inpainted in the first inpainted image. The method includes creating a second inpainted image by increasing a resolution of the first inpainted image from the first resolution to a second resolution. The second resolution
(Continued)

is greater than the first resolution such that the one or more inpainted masked regions have an increased resolution. The method includes providing the second inpainted image to a second neural network. The second neural network outputs a first refined inpainted image at the second resolution, and the first refined inpainted image is a refined version of the second inpainted image.

20 Claims, 7 Drawing Sheets

(58) Field of Classification Search
CPC . G06T 2207/10004; G06T 2207/20081; G06T 2207/20084
See application file for complete search history.

(56) References Cited

U.S. PATENT DOCUMENTS

| | | | | |
|---|---|---|---|---|
| 2014/0064614 | A1* | 3/2014 | Hung | G06T 5/77 382/167 |
| 2018/0101932 | A1* | 4/2018 | Kwon | G06T 3/14 |
| 2019/0287283 | A1 | 9/2019 | Lin et al. | |
| 2021/0125313 | A1* | 4/2021 | Bai | G06V 10/806 |

OTHER PUBLICATIONS

Andrey Moskalenko, Deep Two-Stage High-Resolution Image Inpainting, Apr. 27, 2021 (Year: 2021).*
Jiahui Yu, Generative Image Inpainting with Contextual Attention, Jun. 1, 2018 (Year: 2018).*
Soo Ye Kim, "Zoom-to-Inpaint: Image Inpainting with High Frequency Details", Dec. 17, 2020 (Year: 2020).*
Yang Li, "Fine-grained Adversarial Image Inpainting with Super Resolution", Jul. 2019 (Year: 2019).*
The International Search Report (ISR) with Written Opinion for PCT/US2021/054945 dated Feb. 3, 2022, pp. 1-17.
Yi, Zili et al. "Contextual Residual Aggregation for Ultra High-Resolution Image Inpainting" IEEE/CVF Conference on Computer Vision and Pattern Recognition (CVPR) (2020), pp. 7505-7514.
Chakraborty, Souradeep et al. "Deep image inpainting with region prediction at hierarchical scales" Computer Vision, Graphics and Image Processing, ACM, 2 Dec. 18, 2016 (Dec. 18, 2016), pp. 1-8, XP058308032.
Yu, Jiahui et al. "Generative Image Inpainting with Contextual Attention", arxiv.org, Cornell University Library, Jan. 24, 2018 (Jan. 24, 2018), XP081222647.
Zeng, Yu et al. "High-Resolution Image Inpainting with Iterative Confidence Feedback and Guided Upsampling" arxiv.org Jul. 14, 2020 (Jul. 14, 2020), XP081711435, pp. 1-17.

* cited by examiner

SYSTEMS AND METHODS FOR INPAINTING IMAGES AT INCREASED RESOLUTION

CROSS-REFERENCE TO RELATED APPLICATION

This application is a U.S. National Phase of International Application No. PCT/US2021/054945, filed Oct. 14, 2021, which claims priority to U.S. Provisional Application No. 63/091,308, filed Oct. 14, 2020, both of which are incorporated by reference herein in their entirety.

BACKGROUND

Unless otherwise indicated herein, the materials described in this section are not prior art to the claims in this application and are not admitted to be prior art by inclusion in this section.

Images can represent aspects of a scene that a system may automatically remove. For example, one or more aspects of the scene may distract a viewer of the image from an intended subject of the image (e.g., a person or piece of artwork). The system may remove these aspects of the environment from the image, leaving blank areas to be inpainted.

Inpainting the blank areas allows the image to appear cohesive while also omitting the aspects of the scene.

SUMMARY

In a first example, a system is provided. The system includes a computing device. The computing device includes one or more processors, a memory, and a non-transitory computer readable medium having instructions stored thereon that when executed by a processor cause performance of a set of functions. The set of functions includes receiving an input image. The input image corresponds to one or more masked regions to be inpainted. The set of functions includes providing the input image to a first neural network. The first neural network outputs a first inpainted image at a first resolution, and the one or more masked regions are inpainted in the first inpainted image. The set of functions includes creating a second inpainted image by increasing a resolution of the first inpainted image from the first resolution to a second resolution. The second resolution is greater than the first resolution such that the one or more inpainted masked regions have an increased resolution. The set of functions includes providing the second inpainted image to a second neural network. The second neural network outputs a first refined inpainted image at the second resolution, and the first refined inpainted image is a refined version of the second inpainted image.

In a second example, a method is provided. The method includes receiving an input image. The input image corresponds to one or more masked regions to be inpainted. The method includes providing the input image to a first neural network. The first neural network outputs a first inpainted image at a first resolution, and the one or more masked regions are inpainted in the first inpainted image. The method includes creating a second inpainted image by increasing a resolution of the first inpainted image from the first resolution to a second resolution. The second resolution is greater than the first resolution such that the one or more inpainted masked regions have an increased resolution. The method includes providing the second inpainted image to a second neural network. The second neural network outputs a first refined inpainted image at the second resolution, and the first refined inpainted image is a refined version of the second inpainted image.

In a third example, a non-transitory computer readable medium is provided. The non-transitory computer readable medium has instructions stored thereon that when executed by a processor cause performance of a set of functions. The set of functions includes receiving an input image. The input image corresponds to one or more masked regions to be inpainted. The set of functions includes providing the input image to a first neural network. The first neural network outputs a first inpainted image at a first resolution, and the one or more masked regions are inpainted in the first inpainted image. The set of functions includes creating a second inpainted image by increasing a resolution of the first inpainted image from the first resolution to a second resolution. The second resolution is greater than the first resolution such that the one or more inpainted masked regions have an increased resolution. The set of functions includes providing the second inpainted image to a second neural network. The second neural network outputs a first refined inpainted image at the second resolution, and the first refined inpainted image is a refined version of the second inpainted image.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

Automatically inpainting an image typically involves training one or more neural networks to fill in one or more masked regions of an input image with features surrounding the masked regions. For example, a mask of regions for inpainting can be determined by determining one or more regions in the input image that distract from a subject of the image (e.g., a person, a piece of art, a building, or another object). These might be other objects in the foreground of a scene that amount to unnecessary or unwanted information (e.g., people, vehicles, or other objects). A neural network can be trained to identify these aspects of the image and to output an image corresponding to a mask defining the regions to be inpainted. When inpainting, aspects of the background can be used to fill in the regions previously occupied by the distracting features of the image.

Inpainting an input image using one or more neural networks can involve using a first neural network trained to coarsely inpaint the masked regions. However, the first neural network may be blurry, discolored, or otherwise inconsistent with original portions of the input image. A second neural network can be used to refine the coarsely inpainted masked regions, but these regions may still be noticeably different from the surrounding features of the image. Apart from being less aesthetically pleasing, these images may be less suitable for image processing operations, such as edge detection or object detection. Accordingly, existing frameworks for automatically inpainting input images using software methods, and particularly those that involve neural networks, have limitations that correspond to digital image processing technology.

The examples described herein address these limitations by providing a framework for inpainting an input image which includes upscaling resolution of an initial inpainted image, and using the upscaled version as an input to the second neural network. This results in an inpainted output image that has a higher resolution than the input image, and the provides inpainted regions that are compatible with other aspects of the output image.

Within examples, upscaling the initial inpainted image includes providing a super-resolution network between the coarse network and the refinement network. This architecture results in an upscaled image in which the initial inpainted image, including the inpainted regions, have a higher resolution than the input image. Using the super-resolution network may allow the refinement network to effectively magnify and refine unnatural details in particular portions of the initial inpainted image.

Within examples, the output image can be down sampled to reduce the output resolution, depending on constraints of imposed by a request for the output image. In other examples, the high-resolution output image can be used as the output image, such that the inpainting framework provides both effectively refined inpainting, and a higher resolution output relative to the input image.

II. Example Systems

Figure 1:
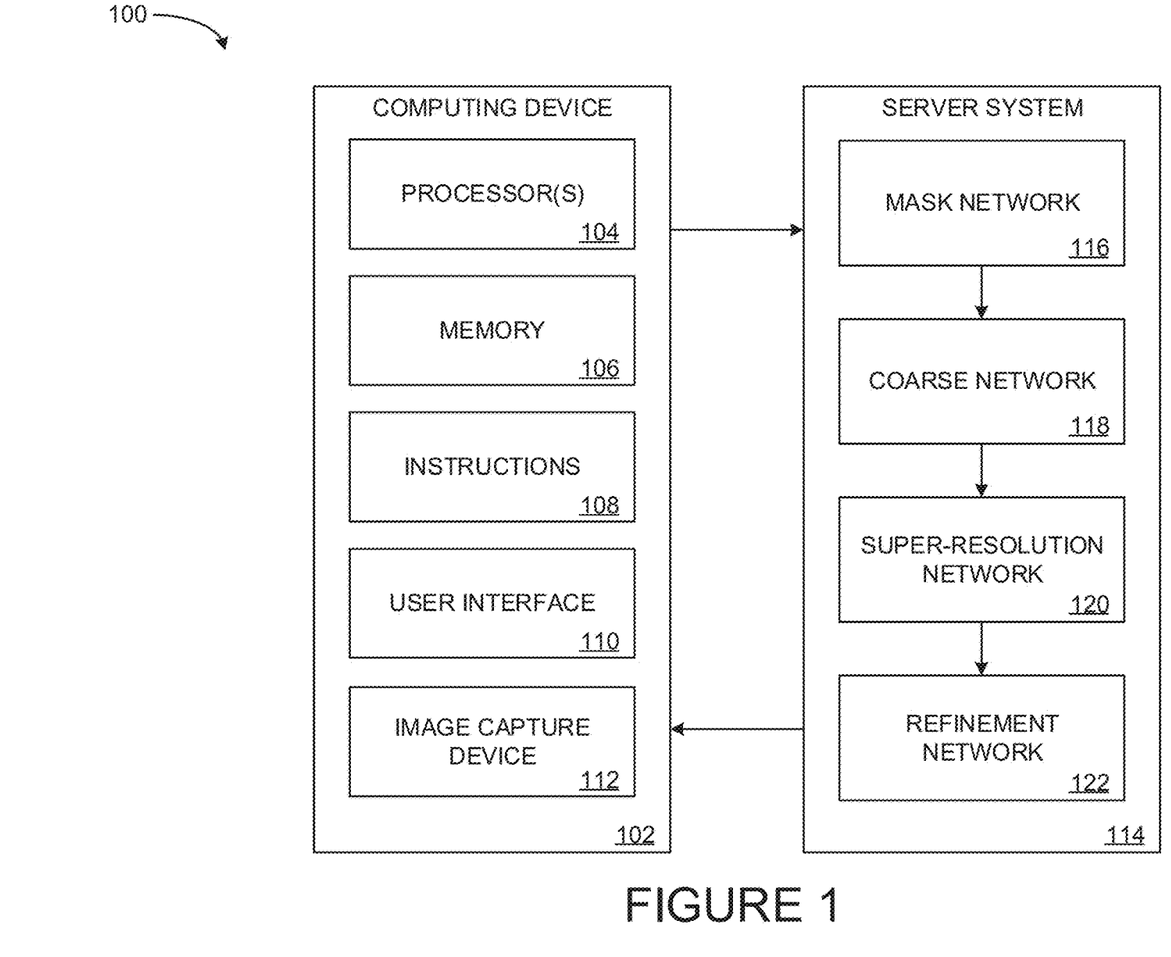
FIG. 1 is a block diagram of a system, according to an example embodiment.

FIG. 1 is a block diagram of a system, according to an example embodiment. In particular, FIG. 1 shows a system 100 having a computing device 102 and a server system 114. The computing device 102 includes processor(s) 104, a memory 106, and instructions 108 stored on the memory 106 and executable by the processor(s) 104 to perform fractions.

The processor(s) 104 can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The memory 106 may include a computer readable medium, such as a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are contemplated herein.

The instructions 108 are stored on memory 106 and are executable by processor(s) 104 to carry out functions described herein.

Computing device 102 further includes a user interface 110 and an image capture device 112. The image user interface can include a touchscreen, a keyboard, or any other device configured to sense user input. The image capture device 112 can be any device configured to capture an image, such as an RGB image. For example, image capture device 112 can include a camera.

The server system 114 is communicatively coupled to computing device 102. Server system 114 is configured to receive an input image from computing device 102, and to generate a an output image with inpainted regions of the input image. Server system 114 includes a mask network 116, a coarse network 118, a super-resolution network 120, and a refinement network 122. These components of the server system 114 may be implemented in hardware (e.g., by using one or more specialized deep neural network computing devices) in software (e.g., by connecting outputs of processors and/or computing devices together to carry out functionality of the neural networks). In certain implementations, server system 114 can represent a set of cloud servers associated with computing device 102. For example, computing device 102 can be a mobile device connected to a network provider, and the network provider can facilitate communication between computing device 102 and the set of cloud servers for storage and/or processing purposes. In other examples, server system 114 can be local to computing device 102 or combined with computing device 102. Other configurations of system 100 are possible. Server system 114 can include a plurality of computing devices having processors, memories, and instructions configured in a similar manner to those described above with respect to computing device 102.

The mask network 116 is a neural network configured for extracting two-dimensional features from images. For example, the mask network 116 can be an object detection network for generating masks that remove one or more objects from an input image, a segmentation network for masks that define one or more boundaries between foreground and background regions in an input image, an optical character recognition (OCR) network for generating masks that remove text in an input image, or other networks configured for identifying features to remove from an input image.

The mask network 116 is configured to receive an image from computing device 102, perhaps via a network. The mask network 116 extracts a plurality of two-dimensional features to output a masked version of the input image that defines one or more regions for inpainting. For example, this may involve using at least one convolutional layer, a pooling layer, and one or more hidden layers configured to filter and downsample the image into a plurality of extracted two-dimensional features used for identifying regions to be inpainted. The regions correspond to a mask that is multiplied with the input image to remove information from the masked regions (e.g., by setting pixel values to white or black).

Within examples, masks can be generated using other means, such as by image processing techniques that automatically identify regions to remove from an input image without using a neural network. In other examples, a user of a computing device (e.g., the computing device 102) can manually select regions to remove, and the input image can be provided directly to the coarse network 118.

The coarse network 118 is a neural network configured for inpainting masked regions of an input image received from the mask network 116. For example, the coarse network 118 can be a two-dimensional convolutional neural network (2D CNN) implemented as a residual network, a U-Net, an auto-encoder, or another type of neural network configured for inpainting images. The 2D CNN may include residual connections, dense connections, or another type of skip connection, a generative adversarial network (GAN), or other architectural features configured for identifying masked regions for inpainting and automatically generating information to populate into the regions.

The coarse network 118 is configured to receive an input image from the computing device 102, a computing device associated with the mask network 116, or another computing device, perhaps via a network. The coarse network 118 outputs an inpainted version of the masked input image in which one or more masked regions are populated with automatically-generated information determined based on extracted two-dimensional features of the input image. For example, this may involve an encoder using at least one convolutional layer, a pooling layer, and one or more hidden layers configured to filter and downsample the image into a plurality of extracted two-dimensional intermediate features, and a decoder using at least one convolutional layer, a pooling layer, and one or inure hidden layers configured to filter and upsample the intermediate features into another set of two-dimensional features used for identifying one or more masked regions for inpainting and generating pixel values used to fill the one or more masked regions.

The super-resolution network 120 is a neural network configured for increasing a resolution of an input image. For example, the super-resolution network 120 can be a Super-Resolution Convolutional Neural Network (SRCNN), a residual network, a generative adversarial network (GAN), or another type of neural network configured for upscaling and/or increasing resolution of an input image. For example, the super-resolution network 120 can be a 2D CNN implemented as a residual network, and may include pixel shuffle layer or an upsampling layer, residual connections or dense connections or another type of skip connection for upsampling an input image.

The super-resolution network 120 is configured to receive an inpainted image from a computing device associated with the coarse network 118, or another computing device, perhaps via a network. The super-resolution network 120 increases resolution of the inpainted image, including pixels within the inpainted regions. For example, this may involve using one or more convolutional layers followed by at least one upsampling layer, and one or more post-upsampling layers, to increase the resolution of the inpainted image.

Though a super-resolution network is shown in FIG. 1, other ways of upscaling and/or increasing resolution of inpainted images are possible. For example, interpolation methods, such as bicubic or bilinear interpolation can be used. Increasing the resolution of the inpainted image allows the refinement network 122 to locally correct unnatural details of the inpainted regions and allows for higher resolution labels than those resulting from the initial inpainted image from the coarse network 218.

The refinement network 122 is a neural network configured for refining aspects of an input image. For example, the refinement network 122 can be a 2D CNN implemented as a residual network, a U-Net, an auto-encoder, or another type of neural network configured for inpainting images. The 2D CNN may include residual connections, dense connections, or another type of skip connection, a generative adversarial network (GAN), or other architectural features configured for identifying local portions of inpainted masked regions for refinement and automatically generating information to populate into the local portions of the inpainted regions.

The refinement network 122 is configured to receive an input image from a computing device associated with the super-resolution network 120, or another computing device used for upscaling the inpainted image, perhaps via a network. The refinement network 122 extracts a plurality of two-dimensional features to output a refined inpainted version of the original masked input image in which the one or more masked regions are populated with altered automatically-generated information determined based on extracted two-dimensional features of the input image. For example, this may involve using contextual attention and gated convolution in at least one convolutional layer to extract and alter two-dimensional features of the upscaled inpainted image. In particular, the use of contextual attention allows for the refinement network 122 to compute the similarity between a masked region and surrounding areas (e.g., edges of the masked regions and portions of the image directly surrounding the edges), and to copy or adjust pixels from the surrounding areas based on weighting the surrounding areas with a similarity score. In this manner, the refinement network 122 can focus on coarsely inpainted regions to refine the output. As noted above, increasing the resolution of the inpainted image allows the refinement network 122 to locally correct unnatural details of the inpainted regions and allows for higher resolution labels than those resulting from the initial inpainted image from the coarse network 218, which may result in inpainting with clear features that are cohesive with surrounding areas of the output image.

The server system 114 provides an output image to the computing device 102 or another computing device that has requested an inpainted image. For example, a user device (e.g., a mobile phone, tablet, or personal computer) may capture an image and automatically send the image to the server system 114 along with a request for an output image with distracting aspects of the image removed and replaced with inpainting. The server system 114 can return an output image from the refinement network 122, or a downsampled version (e.g., using bicubic downsampling) of the output image to return the output image to the same resolution as the input image. Further details of providing output images are described below with respect to FIG. 3.

Within examples, the mask network 116, the coarse network 118, the super-resolution network 120, and the refinement network 122 are pre-trained separately prior to being implemented collectively for inpainting an input image. This may allow for more predictable outputs from each network. After pre-training, each network, or at least the coarse network 118 and the refinement network 122 can be jointly trained.

Figure 2A:
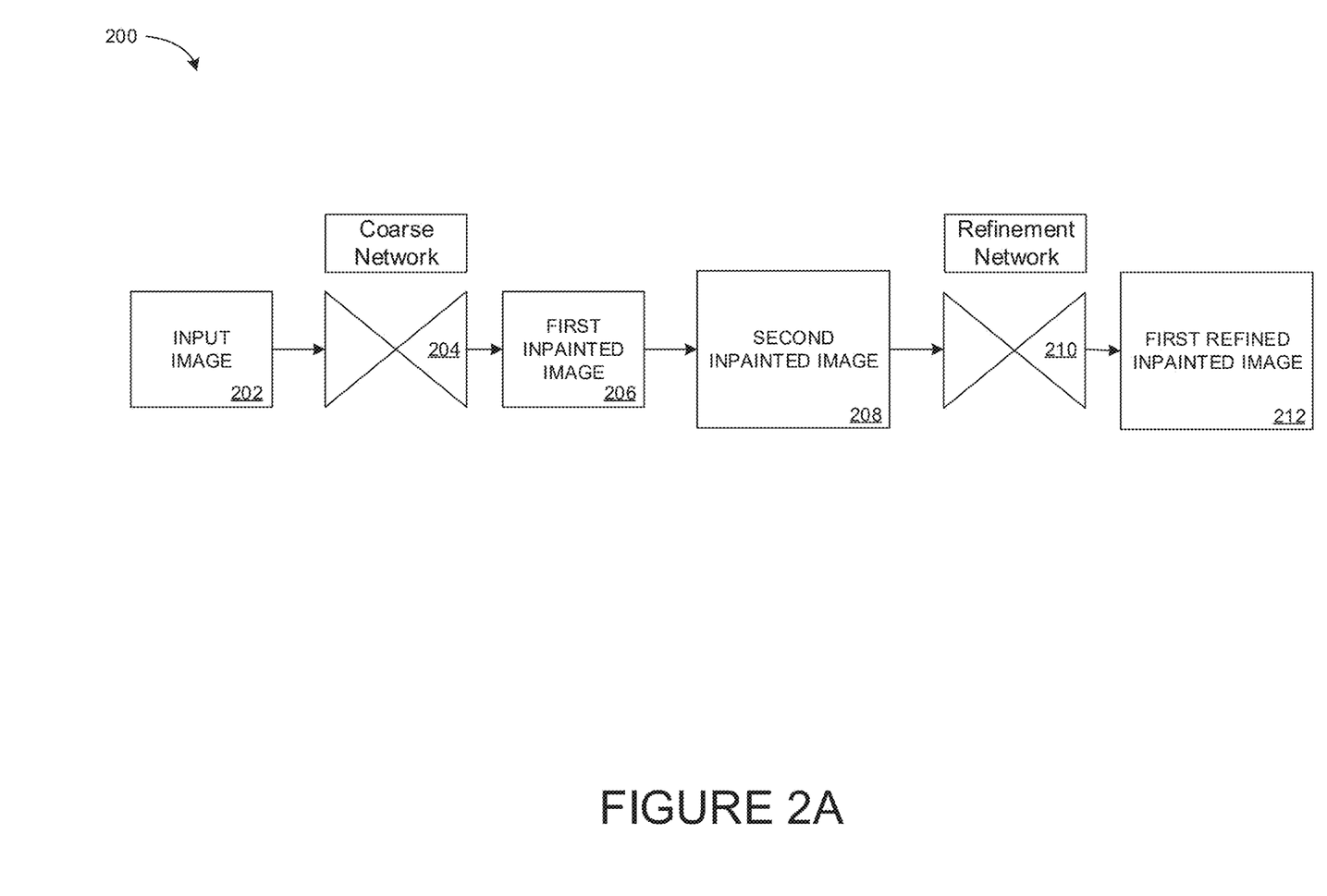
FIG. 2A is a flow chart of a method for image inpainting implemented by a system, according to an example embodiment.

FIG. 2A is a flow chart of a method 200 for image inpainting implemented by a system, according to an example embodiment. Within examples, the method 200 can be carried out using system 100, the server system 114, or a computing device thereof. At block 202, method 200 includes receiving an input image. For example, the server system 114 can receive the image from the computing device 102, perhaps via a network, or a computing device within the server system 114 can receive the input image from the mask network 116. The image can be a monocular RGB or grayscale image, and thus can represent a multi-channel or single-channel input, and include a two-dimensional array of data. The input image includes one or more masked regions, perhaps output by the mask network 116.

At block 204, the method 200 includes providing the input image to a coarse network. The coarse network may be similar to the coarse network 116 described above with respect to FIG. 1. The coarse network is configured to output a first inpainted image.

At block 206, the method 200 includes receiving the first inpainted image from the coarse network.

At block 208, the method 200 includes creating a second inpainted image using the first inpainted image. In particular, this involves increasing a resolution of the first inpainted image from a first resolution to a second resolution. For example, this may involve using a neural network (e.g., a super-resolution network) to increase the resolution, or can include upscaling the resolution using interpolation (e.g., bicubic interpolation). Other ways of increasing the resolution of the first inpainted image to create the second inpainted image are possible.

At block 210, the method includes providing the second inpainted image to a refinement network configured to refine aspects of the second inpainted image. In particular, the refinement network may refine aspects of the inpainted masked regions from the second inpainted image. The refinement network may leverage the increased resolution of the second inpainted image to focus on finer local details in the second inpainted image, and determine high resolution labels for a realistic and refined output image.

At block 212, the method 200 includes receiving a first refined inpainted image from the refinement network. The first refined inpainted image may be at the same resolution as the high-resolution second inpainted image, allowing for an output that simultaneously upscales and inpaints an image. Within examples, the first refined inpainted image can be downsampled to increase data transfer rates of images, reduce computational strains on a receiving computing device, or based on details of a request received from a requesting computing device. Further details of outputting images using a computing device are described below.

Figure 2B:
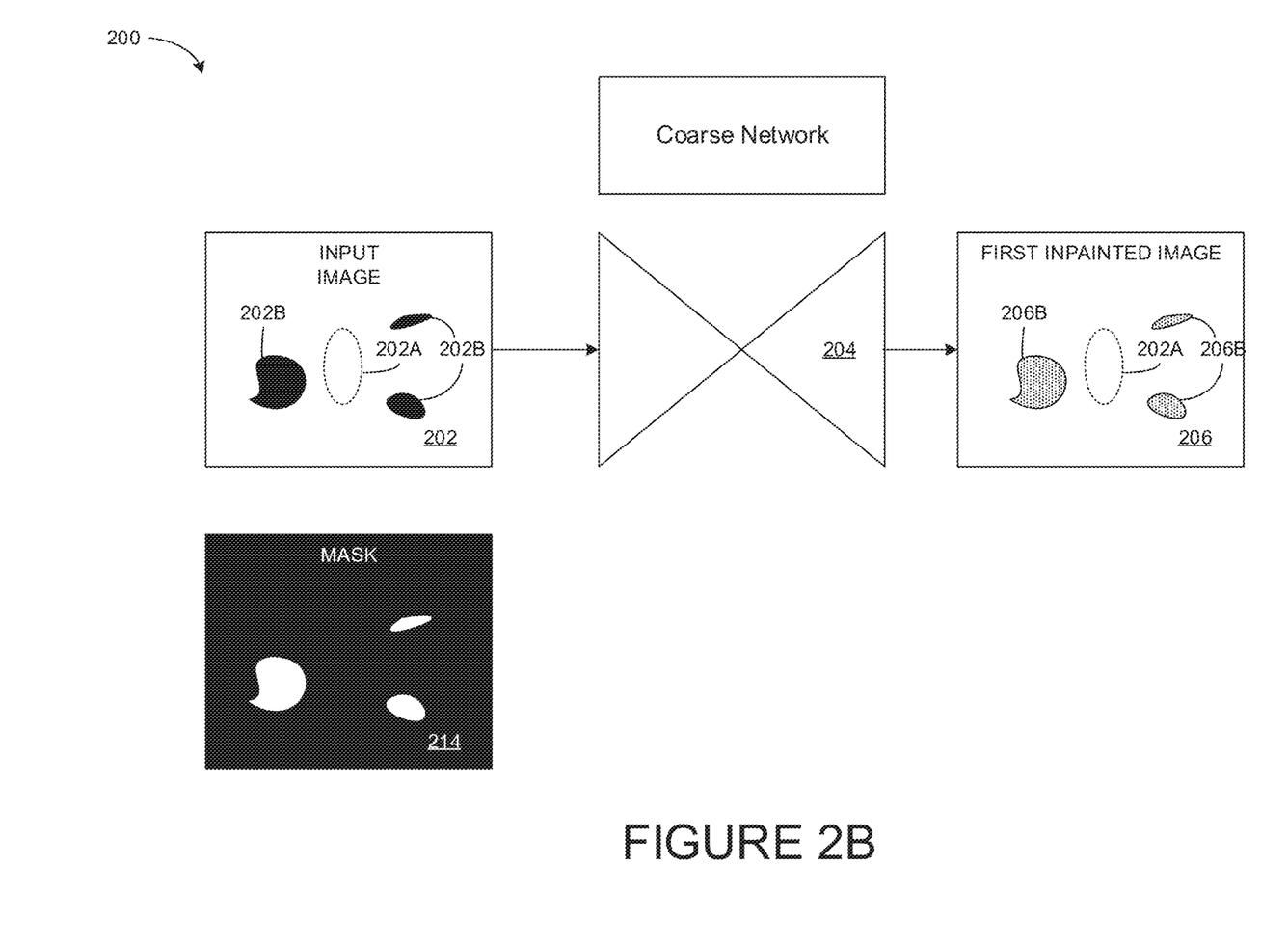
FIG. 2B is a portion of the flow chart of a method for image inpainting implemented by a system, according to an example embodiment.

FIG. 2B is a portion of the flow chart of the method 200, according to an example embodiment. In particular, FIG. 2B includes additional details of blocks 202, 204, and 206.

At block 202, the method 200 includes receiving the input image. The input image includes a subject 202A and one or more masked regions 202B. FIG. 2B also shows an additional step of method 200. At block 214, the method 200 includes receiving a mask, which defines the one or more masked regions 202B. The input image and the mask can be provided together to the coarse network.

As shown in FIG. 2B, the one or more masked regions 202B are "empty" in the input image, but have been filled with some information (e.g., pixel values) in the first inpainted image. The first inpainted image includes the subject 202A, which can be substantially unaltered by the coarse network, and one or more inpainted masked regions 206B.

Figure 2C:
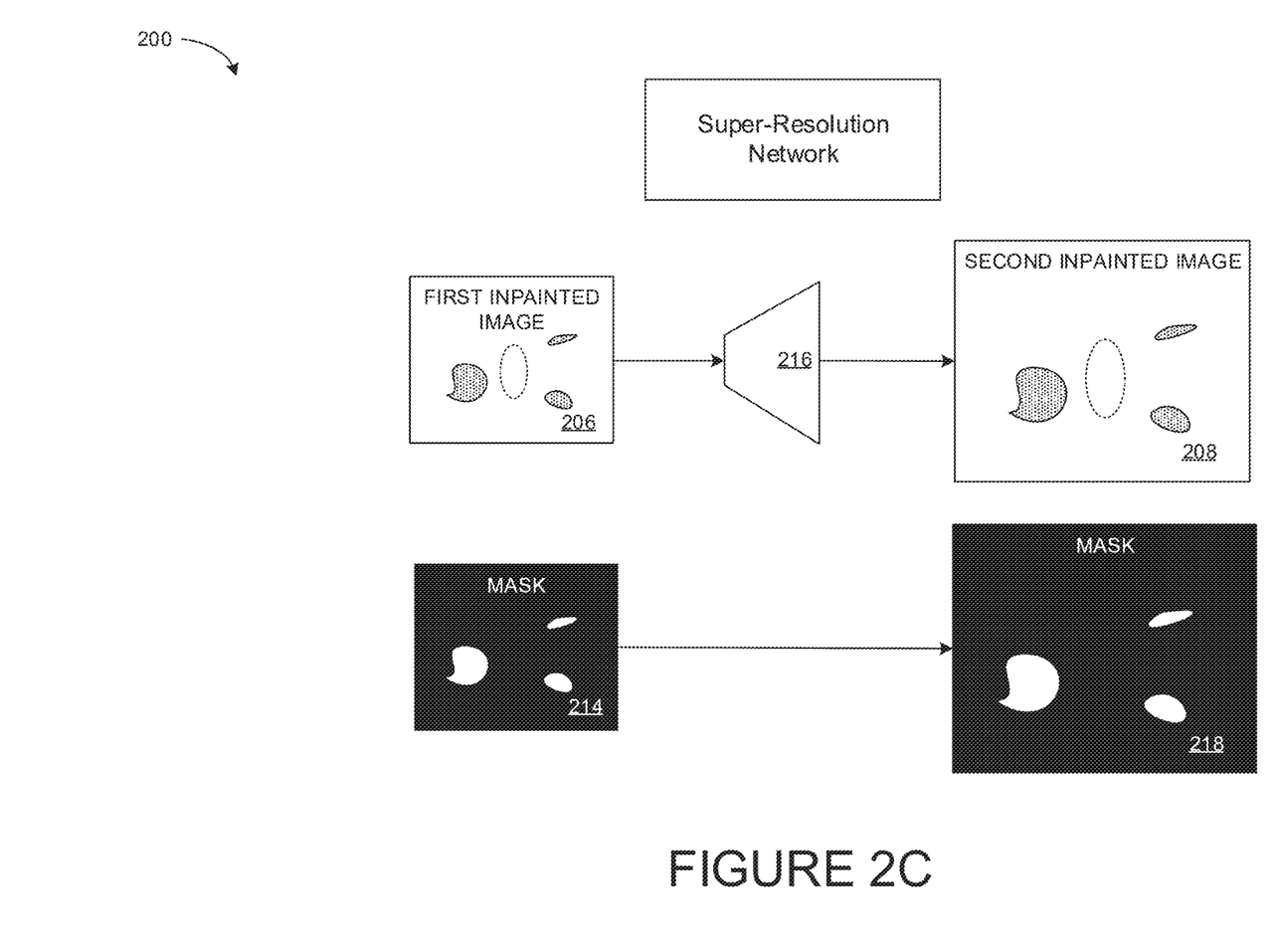
FIG. 2C is a portion of the flow chart of a method for image inpainting implemented by a system, according to an example embodiment.

FIG. 2C is a portion of the flow chart of the method 200, according to an example embodiment. In particular. FIG. 2B includes additional details of block 208. In particular, FIG. 2C also shows additional steps of method 200 relating to block 208. At block 216, the method 200 includes providing the first inpainted image to a super-resolution network. The super-resolution network increases the resolution of the second inpainted image, including the inpainted masked regions. Accordingly, creating the second inpainted image at block 208 can include providing the first inpainted image to a super-resolution network at block 216.

Further, at block 218, the method 200 includes creating a second mask by increasing the resolution of the first mask from block 214. Within examples, the resolution can be increased by interpolation (e.g., bicubic interpolation) to reduce processing requirements of the system because the mask includes fewer details for adjustment. Accordingly increasing the resolution of the first inpainted image at block 208 can be performed differently than increasing the resolution of the first mask at block 218.

Figure 2D:
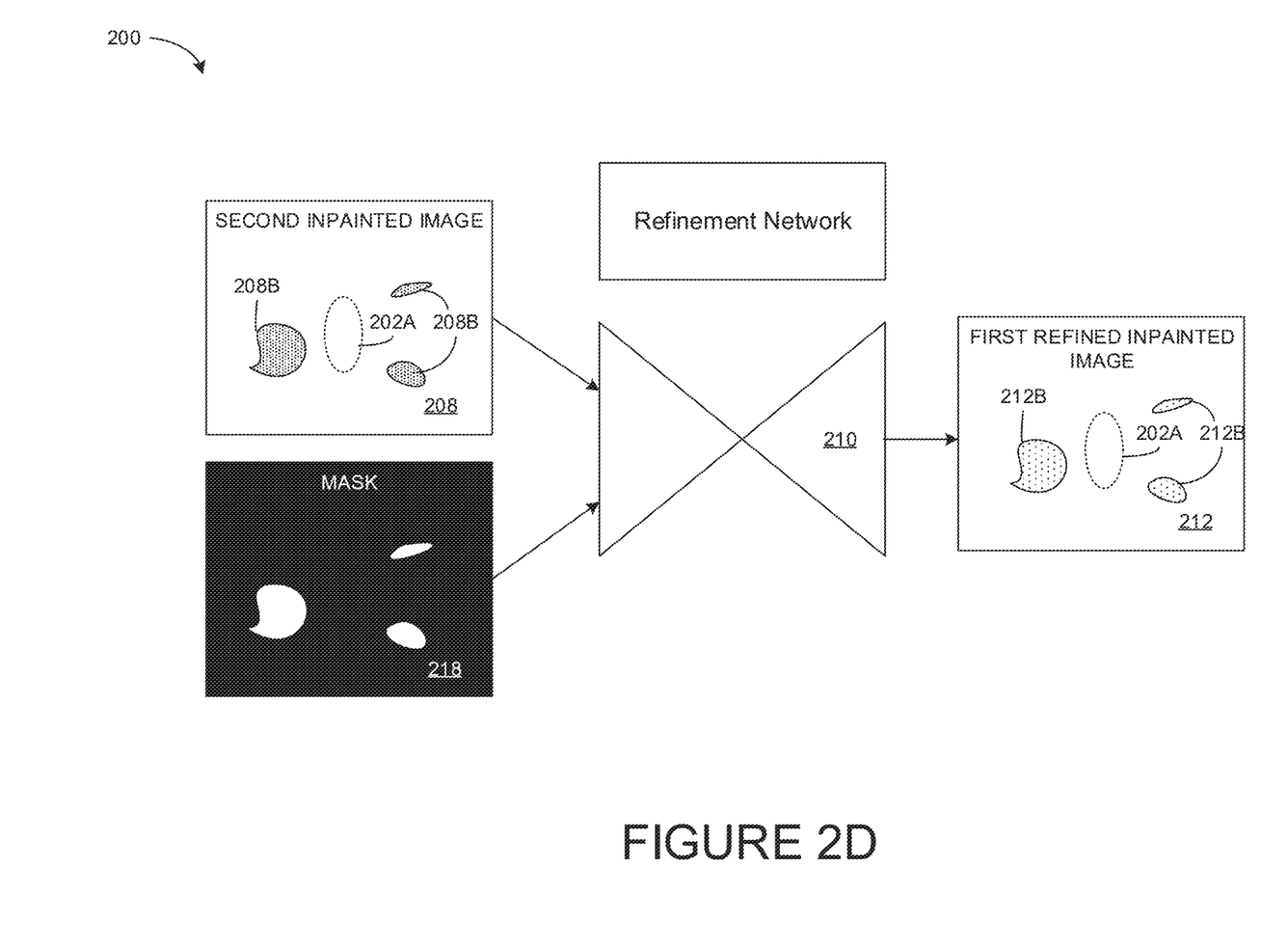
FIG. 2D is a portion of the flow chart of a method for image inpainting implemented by a system, according to an example embodiment.

FIG. 2D is a portion of the flow chart of the method 200, according to an example embodiment. In particular, FIG. 2B includes additional details of block 210. Within examples, at block 210, the method 210 further includes providing the second mask to the refinement network. In this manner, the refinement network is trained using a high-resolution inpainted image and a high-resolution mask, allowing for more accurate refinements in the output image.

As shown in FIG. 2D, the second inpainted image includes the subject 202A and high-resolution inpainted regions 208B and the first refined inpainted image includes the subject 202A and one or more refined inpainted regions 212B. FIG. 2D illustrates that the refined inpainted regions 212B more closely match the background than the high-resolution inpainted regions 208B.

Figure 2E:
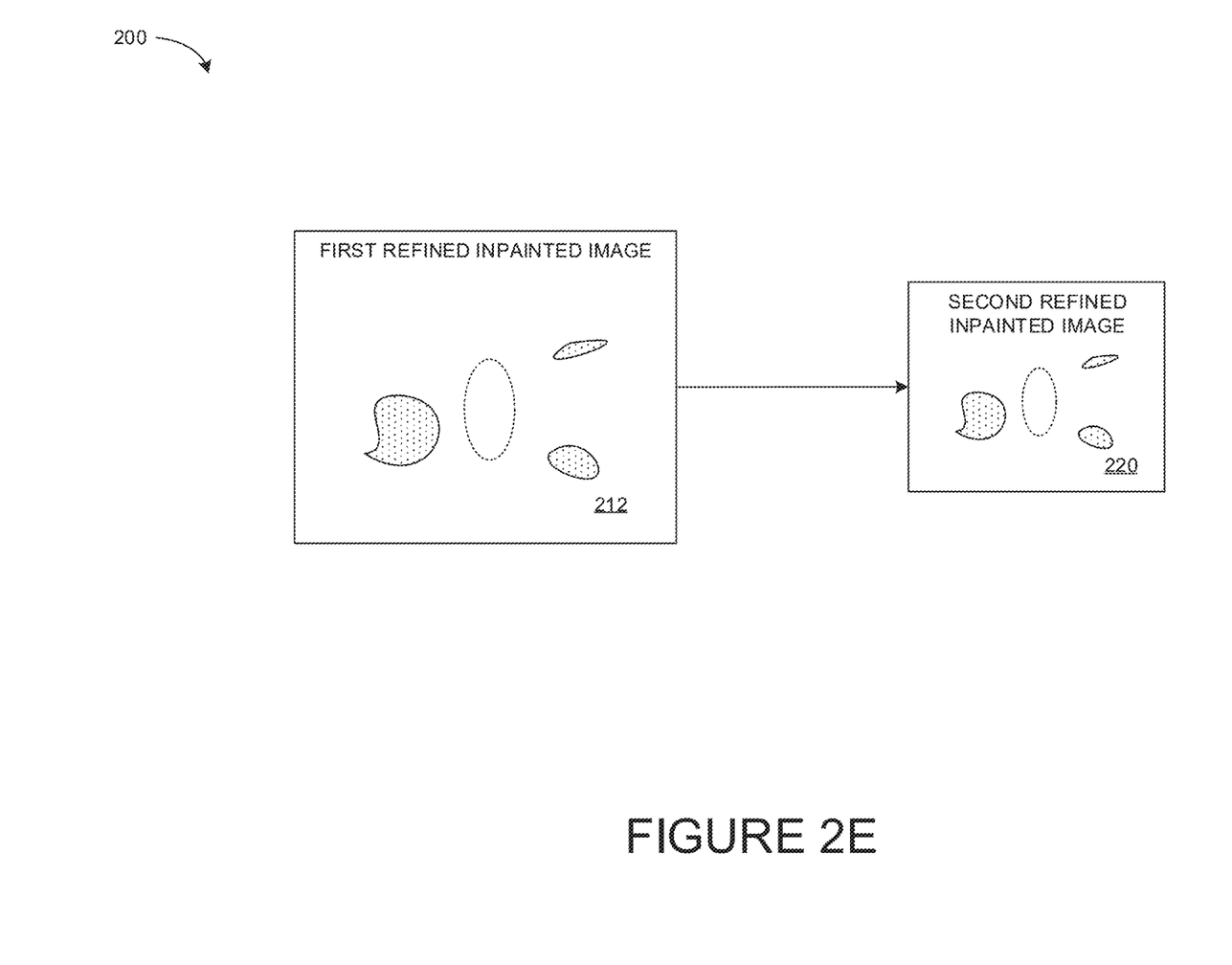
FIG. 2E is a portion of the flow chart of a method for image inpainting implemented by a system, according to an example embodiment.

FIG. 2E is a portion of the flow chart of the method 200, according to an example embodiment. In particular, FIG. 2E shows block 220 following block 212. At block 220, the method 200 includes creating a second refined inpainted image by reducing the resolution of the first refined inpainted image. For example, this may involve reducing the resolution to match that of the input image received at block 202. In some examples, the method 200 further includes determined which refined inpainted image to output based on constraints imposed by a request for the output image. For example, a data transfer threshold or processing time threshold may be imposed in the request, and output image can be selected based on the threshold. While downsampling the first refined inpainted image reduces the resolution of the second refined inpainted image, increasing the resolution allows for more effective inpainting, which is passed along to the second refined inpainted image.

III. Example Methods

Figure 3:
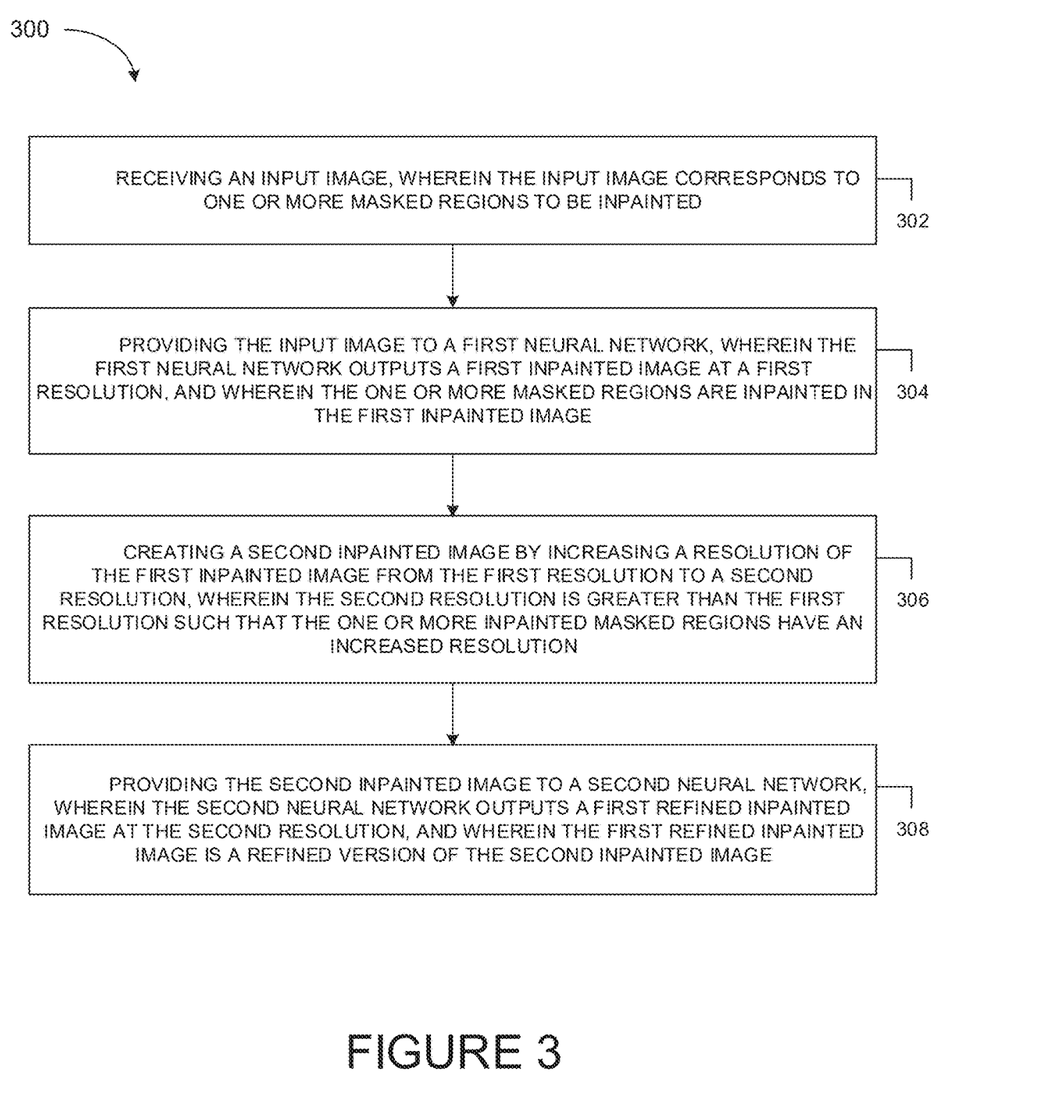
FIG. 3 is a block diagram of a method, according to an example embodiment.

FIG. 3 is a block diagram of a method, according to an example embodiment. In particular, FIG. 3 depicts a method 300 for use in generating a depth estimation of an image using a hybrid neural network structure. The method 300 may be implemented in accordance with FIGS. 1, 2A-2E, components thereof, or the description thereof. For examples, aspects the method 400 may be performed by computing device 102, server system 114, one or more computing devices, or by logical circuitry configured to implement the functions described above.

At block 302, the method 300 includes receiving an input image, wherein the input image corresponds to one or more masked regions to be inpainted. For example, this may correspond to block 202 depicted in FIGS. 2A and 2B.

At block 304, the method 300 includes providing the input image to a first neural network. The first neural network outputs a first inpainted image at a first resolution, and the one or more masked regions are inpainted in the first inpainted image. For example, this may correspond to block 204 depicted in FIGS. 2A and 2B.

Within examples, the method 300 further includes receiving a mask associated with the input image, and providing the mask to the first neural network with the input image. For example, the first neural network can be trained using a plurality of input images and corresponding masks. Within examples, the input image is multiplied with the mask prior to providing the input image to the first neural network. In other examples, the input image is provided directly to the neural network with the mask. Other implementations of providing the input image to the first neural network are possible.

At block 306, the method 300 includes creating a second inpainted image by increasing a resolution of the first inpainted image from the first resolution to a second resolution. The second resolution is greater than the first resolution such that the one or more inpainted masked regions have an increased resolution. For example, this may correspond to block 208 depicted in FIGS. 2A and 2C.

At block 308, the method 300 includes providing the second inpainted image to a second neural network. The second neural network outputs a first refined inpainted image at the second resolution, and the first refined inpainted image is a refined version of the second inpainted image. For example, this may correspond to block 210 depicted in FIGS. 2A and 2D.

Within examples, creating the second inpainted image providing the first inpainted image to a super-resolution network. The super-resolution network outputs the second inpainted image at the second resolution.

Within examples, the method 300 further includes downsampling the first refined inpainted image to create a second refined inpainted image at the first resolution, and using the second refined inpainted image as an output image. In related examples the method 300 further includes determining an operational context for the refined inpainted image, and based on the determined operational context, downsampling the first refined inpainted image to create a second refined inpainted image with a third resolution that is less than the second resolution. Within examples, the operational context corresponds to a data processing threshold associated with a request from a second computing device. For example, the method 300 may be performed by a first computing device (e.g., a computing device of the server system 114), and a second computing device (e.g., a computing device of a mobile phone, a tablet, or a personal computer) can include a data transfer or data processing threshold configured to reduce time to transfer and process the output image. As another example, the operational threshold may be a threshold resolution associated with a screen used for displaying the output image.

Within examples, the method 300 includes downsampling the first refined inpainted image to create a second refined inpainted image, receiving a request for an output image from a second computing device, and based on the request, using the first refined inpainted image as the output image rather than the second refined inpainted image as the output image. For example, the request may include a requested resolution that exceeds the resolution of the second refined inpainted image. In related examples, the method 300 includes receiving a request for an output image from a second computing device, based on the request, determining to output the first refined inpainted image rather than downsampling the first refined inpainted image to create a second refined inpainted image, using the first refined inpainted image as the output image, wherein the output image is an inpainted version of the input image at an increased resolution relative to the input image. In this manner, the computing device can prevent computational costs associated with downsampling the first refined inpainted image.

Within examples, a first mask defines the one or more masked regions, as shown in FIG. 2B. In these examples, the method 300 includes creating a second mask by increasing a resolution of the first mask from the first resolution to the second resolution, and, while providing the second inpainted image to the second neural network, providing the second mask to the second neural network. For example, this may be performed as described above with respect to FIGS. 2C and 2D. Within examples, increasing the resolution of the first inpainted image from the first resolution to the second resolution is performed differently than increasing the resolution of the first mask from the first resolution to the second resolution. For example, this may be performed as described above with respect to FIG. 2C. Within examples, the method 300 further includes training the second neural network using both the second inpainted image and the second mask. For example, this may be performed as described above with respect to FIG. 2D.

Within examples, the first neural network corresponds to the first resolution and the second neural network corresponds to the second resolution. In these example, the method 300 further includes training the first neural network and the second neural network simultaneously using the input image and the second inpainted image.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include norm-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
one or more processors;
a memory; and
a non-transitory computer readable medium having instructions stored thereon that when executed by a processor cause performance of a set of functions, wherein the set of functions comprises:
receiving an input image, wherein the input image comprises one or more masked regions to be inpainted and one or more non-masked regions;
providing the input image to a first neural network, wherein the first neural network outputs a first inpainted image at a first resolution, and wherein the one or more masked regions are inpainted in the first inpainted image;
creating a second inpainted image by increasing a resolution of the first inpainted image from the first resolution to a second resolution, wherein the second resolution is greater than the first resolution such that the one or more inpainted masked regions and the one or more non-masked regions have an increased resolution; and
providing the second inpainted image to a second neural network, wherein the second neural network outputs a first refined inpainted image at the second resolution, and wherein the first refined inpainted image is a refined version of the second inpainted image.

2. The system of claim 1, wherein the computing device, the first neural network, and the second neural network are part of a server system.

3. The system of claim 1, wherein creating the second inpainted image comprises providing the first inpainted image to a super-resolution network, wherein the super-resolution network outputs the second inpainted image at the second resolution.

4. The system of claim 1, the set of functions further comprising:
downsampling the first refined inpainted image to create a second refined inpainted image at the first resolution; and
using the second refined inpainted image as an output image.

5. The system of claim 1, the set of functions further comprising:
determining an operational context for the first refined inpainted image; and
based on the determined operational context, downsampling the first refined inpainted image to create a second refined inpainted image with a third resolution that is less than the second resolution.

6. The system of claim 5, wherein the operational context corresponds to a data processing threshold associated with a request from a second computing device.

7. The system of claim 1, the set of functions further comprising:
receiving a request for an output image from a second computing device;
based on the request, determining to output the first refined inpainted image rather than downsampling the first refined inpainted image to create a second refined inpainted image; and
using the first refined inpainted image as the output image, wherein the output image is an inpainted version of the input image at an increased resolution relative to the input image.

8. The system of claim 1, wherein a first mask defines the one or more masked regions, the set of functions further comprising:
creating a second mask by increasing a resolution of the first mask from the first resolution to the second resolution; and
while providing the second inpainted image to the second neural network, providing the second mask to the second neural network.

9. The system of claim 1, wherein the first neural network corresponds to the first resolution and the second neural network corresponds to the second resolution, the set of functions further comprising:
training the first neural network and the second neural network simultaneously using the input image and the second inpainted image.

10. A method comprising:
receiving, by a computing device, an input image, wherein the input image comprises one or more masked regions to be inpainted and one or more non-masked regions;
providing, by the computing device, the input image to a first neural network, wherein the first neural network outputs a first inpainted image at a first resolution, and wherein the one or more masked regions are inpainted in the first inpainted image;
creating, by the computing device, a second inpainted image by increasing a resolution of the first inpainted image from the first resolution to a second resolution, wherein the second resolution is greater than the first resolution such that the one or more inpainted masked regions and the one or more non-masked regions have an increased resolution; and providing, by the computing device, the second inpainted image to a second neural network, wherein the second neural network outputs a first refined inpainted image at the second resolution, and wherein the first refined inpainted image is a refined version of the second inpainted image.

11. The method of claim 10, wherein creating the second inpainted image comprises providing the first inpainted image to a super-resolution network, wherein the super-resolution network outputs the second inpainted image at the second resolution.

12. The method of claim 10, further comprising:
downsampling the first refined inpainted image to create a second refined inpainted image at the first resolution; and
using the second refined inpainted image as an output image.

13. The method of claim 10, further comprising:
determining an operational context for the first refined inpainted image; and
based on the determined operational context, downsampling the first refined inpainted image to create a second refined inpainted image with a third resolution that is less than the second resolution.

14. The method of claim 13, wherein the operational context corresponds to a data processing threshold associated with a request from a second computing device.

15. The method of claim 10, further comprising:
downsampling the first refined inpainted image to create a second refined inpainted image;
receiving a request for an output image from a second computing device; and
based on the request, using the first refined inpainted image as the output image rather than the second refined inpainted image as the output image.

16. The method of claim 10, wherein a first mask defines the one or more masked regions, the method further comprising:
creating a second mask by increasing a resolution of the first mask from the first resolution to the second resolution; and
while providing the second inpainted image to the second neural network, providing the second mask to the second neural network.

17. The method of claim 16, further comprising training the second neural network using both the second inpainted image and the second mask.

18. The method of claim 16, wherein increasing the resolution of the first inpainted image from the first resolution to the second resolution is performed differently than increasing the resolution of the first mask from the first resolution to the second resolution.

19. The method of claim 10, wherein the first neural network corresponds to the first resolution and the second neural network corresponds to the second resolution, the method further comprising:
training the first neural network and the second neural network simultaneously using the input image and the second inpainted image.

20. A non-transitory computer readable medium having instructions stored thereon that when executed by a processor cause performance of a set of functions, wherein the set of functions comprises:
receiving an input image, wherein the input image comprises one or more masked regions to be inpainted and one or more non-masked regions;
providing the input image to a first neural network, wherein the first neural network outputs a first inpainted image at a first resolution, and wherein the one or more masked regions are inpainted in the first inpainted image;
creating a second inpainted image by increasing a resolution of the first inpainted image from the first resolution to a second resolution, wherein the second resolution is greater than the first resolution such that the one or more inpainted masked regions and the one or more non-masked regions have an increased resolution; and
providing the second inpainted image to a second neural network, wherein the second neural network outputs a first refined inpainted image at the second resolution, and wherein the first refined inpainted image is a refined version of the second inpainted image.

* * * * *